US008458311B2

(12) United States Patent
Jang et al.

(10) Patent No.: US 8,458,311 B2
(45) Date of Patent: Jun. 4, 2013

(54) SYSTEM AND METHOD OF MANAGING QUEUE ORDER, AND TERMINAL DEVICE

(75) Inventors: Tae Ho Jang, Gunpo-si (KR); Jun Hyeong Kim, Anyang-si (KR); Paul Barom Jeon, Yongin-si (KR); Dong Hun Yu, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 370 days.

(21) Appl. No.: 12/623,381

(22) Filed: Nov. 21, 2009

(65) Prior Publication Data

US 2010/0191842 A1 Jul. 29, 2010

(30) Foreign Application Priority Data

Jan. 23, 2009 (KR) ........................ 10-2009-0005931

(51) Int. Cl.
*G06F 15/16* (2006.01)
*G06F 15/173* (2006.01)

(52) U.S. Cl.
USPC ........... 709/223; 709/203; 709/217; 709/219; 709/224

(58) Field of Classification Search
USPC ......................... 709/203, 201; 705/8, 37, 500
See application file for complete search history.

(56) References Cited

U.S. PATENT DOCUMENTS

| | | | | |
|---|---|---|---|---|
| 7,752,146 | B2 * | 7/2010 | Lert, Jr. | 705/500 |
| 7,882,012 | B1 * | 2/2011 | West et al. | 705/37 |
| 2005/0198107 | A1 * | 9/2005 | Cuhls et al. | 709/201 |
| 2009/0024730 | A1 * | 1/2009 | Wu | 709/223 |
| 2009/0076875 | A1 * | 3/2009 | Lert et al. | 705/8 |

FOREIGN PATENT DOCUMENTS

| | | |
|---|---|---|
| JP | 2001-125980 | 5/2001 |
| KR | 1020040007083 | 1/2004 |
| KR | 1020050017947 | 2/2005 |
| KR | 1020050017948 | 2/2005 |
| KR | 1020050090966 | 9/2005 |
| KR | 1020060064921 | 6/2006 |
| KR | 1020060099994 | 9/2006 |
| KR | 1020070121936 | 12/2007 |

* cited by examiner

*Primary Examiner* — Quang N Nguyen
(74) *Attorney, Agent, or Firm* — NSIP Law

(57) ABSTRACT

A system for managing a queue order may receive queue order registration requests from a plurality of user terminals, generate queue order information of the plurality of user terminals, and broadcast, when the queue order information changes, notification information about the change of the queue order information.

16 Claims, 4 Drawing Sheets

SYSTEM AND METHOD OF MANAGING QUEUE ORDER, AND TERMINAL DEVICE

CROSS-REFERENCE TO RELATED APPLICATION

This application claims the benefit under 35 U.S.C. §119 (a) of a Korean Patent Application No. 10-2009-0005931, filed on Jan. 23, 2009, in the Korean Intellectual Property Office, the entire disclosure of which is incorporated herein by reference for all purposes.

BACKGROUND

1. Field

The following description relates to a system and method of managing a queue order, and a terminal device that may be used in the system for managing a queue order.

2. Description of the Related Art

In general, a queuing system may be used to allow a user to know the user's turn in a place such as a bank, a hospital, and the like. A process of a queuing system is described below.

A user may be provided with a queue ticket through a predetermined ticket dispenser on a first-come-first-served basis. When a service for one client is completed, a subsequent queue number of the client may be displayed on a display. Accordingly, clients may be informed of their turn based on the displayed number.

The queuing system described above may provide clients with queue order information. Also, when a number of people wait for goods or services, the queuing system may prevent disorder from occurring and enable appropriate client management.

However, the queuing system may force clients to keep checking their turn until a queue number that a client is provided is displayed, which may be inconvenient.

SUMMARY

In one general aspect, there is provided a system for managing a queue order, the system including an information generation unit configured to receive queue order registration requests from a plurality of user terminals, and configured to generate queue order information of the plurality of user terminals, and a broadcasting unit configured to broadcast, when the queue order information changes, notification information about the change of the queue order information.

The information generation unit may generate queue number information of each of the plurality of user terminals based on an order of receiving the queue order registration requests, and the broadcasting unit may sequentially include the queue number information of each of the plurality of user terminals in the notification information, every time the queue order information changes.

The information generation unit may include an information transmission unit configured to transmit queue number information of any one user terminal of the plurality of user terminals to the one user terminal, when the information generation unit receives a queue order registration request from the one user terminal.

The information generation unit may include a communication information transmission unit configured to transmit broadcasting channel information and address information to any one user terminal of the plurality of user terminals, when a queue order registration request is received from the one user terminal, wherein the one user terminal receives the notification information based on the broadcasting channel information and the address information.

When a cancellation request of the queue order registration is received from any one user terminal of the plurality of user terminals, the information generation unit may update the queue number information of each of the plurality of user terminals based on the queue number information of the one user terminal.

In another general aspect, there is provided a terminal device including a request unit configured to transmit a queue order registration request to a system for managing a queue order, and a notification information receiving unit configured to receive notification information about a change of queue order information, the queue order information being broadcasted from the system for managing a queue order, wherein the system for managing a queue order receives queue order registration requests from a plurality of terminal devices, generates the queue order information of the plurality of terminal devices, and broadcasts the notification information about the change of the queue order information when the queue order information changes.

The system for managing a queue order may generate queue number information of each of the plurality of terminal devices based on an order of receiving the queue order registration requests transmitted from each of the plurality of terminal devices, and the notification information may sequentially include the queue number information of each of the plurality of terminal devices, every time the queue order information changes.

The terminal device may further include a queue number information receiving unit configured to receive first queue number information, associated with a current queue number, from the system for managing a queue order.

The terminal device may further include a communication information receiving unit configured to receive broadcasting channel information and address information from the system for managing a queue order, wherein the notification information receiving unit receives the notification information based on the broadcasting channel information and the address information.

The request unit may transmit a cancellation request of the queue order registration to the system for managing a queue order depending on a choice of a user, and the system for managing a queue order may update the queue number information of each of the plurality of terminal devices based on the first queue number information when the cancellation request of the queue order registration is received.

In still another general aspect, there is provided a method of managing a queue order, the method including receiving by a system for managing a queue order, queue order registration requests from a plurality of user terminals, and generating by the system for managing a queue order, queue order information of the plurality of user terminals, and broadcasting by the system for managing a queue order, when the queue order information changes, notification information about the change of the queue order information.

The generating of the queue order information may include generating queue number information of each of the plurality of user terminals based on an order of receiving the queue order registration requests, and the broadcasting of the notification information may include sequentially including the queue number information of each of the plurality of user terminals in the notification information, every time the queue order information changes.

The generating of the queue order information may include transmitting queue number information of any one user terminal of the plurality of user terminals to the one user terminal, when queue order registration request is received from the one user terminal.

In yet another general aspect, there is provided a computer-readable storage medium storing a program to manage a queue order, comprising instructions to cause a computer to receive queue order registration requests from a plurality of user terminals, and generating queue order information of the plurality of user terminals, and broadcast, when the queue order information changes, notification information about the change of the queue order information.

Other features and aspects will be apparent from the following detailed description, the drawings, and the claims.

Figure 1:
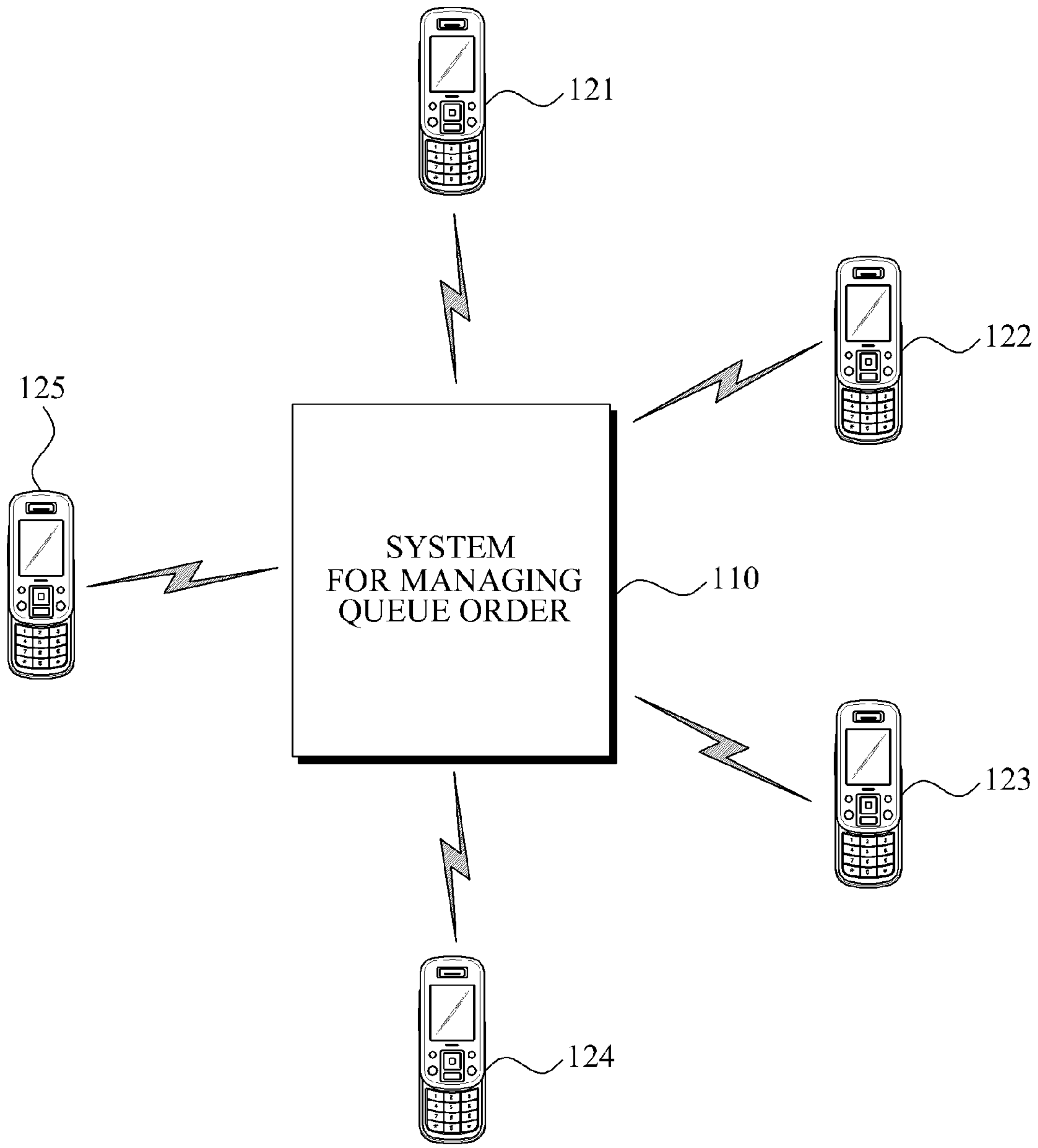
FIG. 1 is a diagram illustrating an example of a system for managing a queue order.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, methods, apparatuses and/or methods described herein will be suggested to those of ordinary skill in the art. Also, descriptions of well-known functions and constructions may be omitted for increased clarity and conciseness.

In general, a queuing system used in a bank or a hospital, for example, may provide clients with queue order information through a display, which may limit a movement range of the clients.

That is, a client is required to keep checking the display until a queue number of the client is displayed. Also, when the client goes to a different place/location or does different things without checking the display displaying the queue number, the client may miss his/her turn.

Accordingly, according to an exemplary embodiment, a system for managing a queue order may transmit queue order information to a user terminal that a user has, and when the queue order information changes, may broadcast notification information about the change to the user terminal. Accordingly, the user may move more freely during the waiting time.

Hereinafter, an exemplary system for managing a queue order is described with reference to FIGS. 1 and 2.

FIG. 1 illustrates an example of a system 110 for managing a queue order.

The system 110 for managing a queue order (also referred to as the system 110) and a plurality of user terminals 121, 122, 123, 124, and 125 are illustrated in FIG. 1.

A user terminal may include all types of terminal devices with a communication function. As a non-exhaustive illustration only, a user terminal device described herein may refer to mobile terminal devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, and devices capable of wireless communication or communication consistent with that disclosed herein.

The system 110 may receive queue order registration requests from one or more of the user terminals 121, 122, 123, 124, and 125, and may generate queue order information of the one or more of the user terminals 121, 122, 123, 124, and 125.

The system 110 may generate the queue order information based on an order of receiving the queue order registration requests from the user terminals 121, 122, 123, 124, and 125.

For example, when the system 110 receives the queue order registration requests in an order of the user terminal (1) 121, the user terminal (2) 122, the user terminal (3) 123, the user terminal (4) 124, and the user terminal (5) 125, the system 110 may set each of the user terminal (1) 121, the user terminal (2) 122, the user terminal (3) 123, the user terminal (4) 124, and the user terminal (5) 125, respectively as a first place, a second place, a third place, a fourth place, and a fifth place, and thereby may generate the queue order information based on the set order.

For example, the user terminals 121, 122, 123, 124, and 125 may transmit the queue order registration requests to the system 110 based on a local wireless communication such as a wireless local area network (WLAN), Bluetooth, and the like.

When the queue order information changes, the system 110 may communicate notification information about the change of the queue order information to the user terminals 121, 122, 123, 124, and 125.

For example, it may be assumed that the system 110 generates the queue order information in such a manner that the user terminal (1) 121 is first, followed by the user terminal (2) 122, the user terminal (3) 123, the user terminal (4) 124, and the user terminal (5) 125, respectively.

When a service for the user terminal (1) 121 is completed, and the user terminal (2) 122 is to be provided with the service in a place such as a bank, for example, the system 110 may broadcast notification information about the change of the queue order information.

When the user terminal (2) 122, the user terminal (3) 123, the user terminal (4) 124, and the user terminal (5) 125 are located in a broadcasting coverage of the system 110, users of the user terminal (2) 122, the user terminal (3) 123, the user terminal (4) 124, and the user terminal (5) 125 may receive the notification information through their respective user terminals, and thereby may be provided with information about, for example, their turn and period of time to wait.

Also, since the users may receive the notification information through their respective user terminals, the users may move freely within the broadcasting coverage of the system 110.

The system 110 may generate queue number information of each of the user terminals 121, 122, 123, 124, and 125 based on the order of receiving the queue order registration requests.

The system 110 may sequentially include the queue number information of each of the user terminals 121, 122, 123, 124, and 125 in the notification information, for example, every time the queue order information changes.

As an example, when the system 110 receives the queue order registration requests in the order of the user terminal (1) 121, the user terminal (2) 122, the user terminal (3) 123, the user terminal (4) 124, and the user terminal (5) 125, the system 110 may generate the queue number information in such a manner that the user terminal (1) 121 is first, followed by the user terminal (2) 122, the user terminal (3) 123, the user terminal (4) 124, and the user terminal (5) 125, respectively.

Also, when the user terminal (1) 121 is a user terminal to be first provided with a service, the system 110 may include queue number information of the user terminal (1) 121 in the notification information, and broadcast the notification information.

When the service for the user terminal (1) 121 is completed, and the user terminal (2) 122 is to be provided with the service, the system 110 may include queue number information of the user terminal (2) 122 in the notification information, and broadcast the notification information.

The system 110 may perform the above-described operation with respect to the user terminal (3) 123, the user terminal (4) 124, and the user terminal (5) 125 in a similar manner.

When the system 110 receives a queue order registration request from one of the user terminals 121, 122, 123, 124, and 125, the system 110 may transmit queue number information of that user terminal to that user terminal.

For example, when the system 110 generates the queue number information in such a manner that the user terminal (1) 121 is first, followed by the user terminal (2) 122, the user terminal (3) 123, and the user terminal (4) 124, respectively, and receives a queue order registration request from the user terminal (5) 125, the system 110 may set the user terminal (5) 125 as a fifth place. Also, the system 110 may generate queue number information of the user terminal (5) 125 based on the set order.

Also, the system 110 may transmit the queue number information of the user terminal (5) 125 to the user terminal (5) 125.

Accordingly, the user of the user terminal (5) 125 may be informed of his/her turn.

When the service for the user terminal (1) 121 is completed, the system 110 may broadcast queue number information of the user terminal (2) 122 which is subsequent to the user terminal (1) 121. When the user terminal (5) 125 is located in the coverage of the system 110, the user terminal (5) 125 may receive the broadcasted queue number information of the user terminal (2) 122. Accordingly, the user of the user terminal (5) 125 may compare the queue number information of the user terminal (2) 122 with the queue number information of the user terminal (5) 125, and may confirm his/her current turn in real time.

The above-described operation may be repeated with respect to the user terminal (3) 123 and the user terminal (4) 124 in a similar manner. Accordingly, when a service for the user terminal (4) 124 is completed, the system 110 may broadcast the queue number information of the user terminal (5) 125 which is subsequent to the user terminal (4) 124.

When the user terminal (5) 125 receives the queue number information of the user terminal (5) 125, the user of the user terminal (5) 125 may confirm that it is his/her turn to receive the service based on the broadcasted queue number information of the user terminal (5) 125.

When the queue order registration request is received from one of the user terminals 121, 122, 123, 124, and 125, the system 110 may transmit broadcasting channel information about broadcasting channel and address information for broadcasting to that user terminal. Accordingly, said user terminal may receive the notification information based on the broadcasting channel information and the address information.

When a cancellation request of the queue order registration is received from one of the user terminals 121, 122, 123, 124, and 125, the system 110 may update the queue number information of each of the user terminals 121, 122, 123, 124, and 125 based on queue number information of the user terminal requesting the cancellation.

For example, it may be assumed that the system 110 may generate queue number information in such a manner that the user terminal (1) 121 is first, followed by the user terminal (2) 122, the user terminal (3) 123, the user terminal (4) 124, and the user terminal (5) 125, respectively.

When a cancellation request of the queue order registration is received from the user terminal (3) 123, the system 110 may update queue number information of the user terminal (1) 121, the user terminal (2) 122, the user terminal (4) 124, and the user terminal (5) 125 based on queue number information of the user terminal (3) 123.

Moreover, the system 110 may broadcast the updated queue number information.

An operation of the system 110 is described below.

It may be assumed, that in one example, the system 110 may be used in a restaurant in a shopping mall.

Also, the operation of the system 110 is described below based on the user terminal (5) 125, with assumptions that the system 110 may generate queue number information in such a manner that the user terminal (1) 121 is first, followed by the user terminal (2) 122, the user terminal (3) 123, and the user terminal (4) 124, respectively.

When the user of the user terminal (5) 125 makes an order in the restaurant in the shopping mall, the user terminal (5) 125 may transmit a queue order registration request to the system 110.

The user terminal (5) 125 may transmit the queue order registration request to the system 110 based on a wireless local area communication such as, for example, a WLAN, Bluetooth, and the like.

The user terminal (5) 125 may provide the user with an input interface associated with the queue order registration request.

Accordingly, when a command of the queue order registration request is received from the user terminal (5) 125 through the input interface, the user terminal (5) 125 may transmit the queue order registration request to the system 110.

When the system 110 receives the queue order registration request from the user terminal (5) 125, the system 110 may set the user terminal (5) 125 as a fifth place, subsequent to the user terminal (1) 121, the user terminal (2) 122, the user terminal (3) 123, and the user terminal (4) 124, and generate queue number information of the user terminal (5) 125.

Afterwards, the system 110 may transmit the queue number information of the user terminal (5) 125 to the user terminal (5) 125.

Also, the system 110 may transmit broadcasting channel information and address information to the user terminal (5) 125.

Additionally, personal information of the user of the user terminal (5) 125 may be included in the system 110. Accordingly, the system 110 may provide the user of the user terminal (5) 125 with customized service information.

For example, the system 110 may store information about a menu that the user of the user terminal (5) 125 has previously ordered. Thus, when the queue order registration request is received from the user terminal (5) 125, the system 110 may transmit information about the user's favorite menu item(s) to the user terminal (5) 125.

When food, ordered by the user of the user terminal (1) 121, is ready in the restaurant, the system 110 may broadcast queue number information of the user terminal (2) 122. Here, the user of the user terminal (1) 121 is the first number in a queue.

In this example, the user terminal (5) 125 may receive the queue number information of the user terminal (2) 122 based on the broadcasting channel information and the address information.

Accordingly, the user of the user terminal (5) 125 may confirm his/her turn.

Through the above-described operation, when food ordered by the user of the user terminal (4) 124, is ready in the restaurant, the system 110 may broadcast queue number information of the user terminal (5) 125.

In this case, the user terminal (5) 125 may receive the queue number information of the user terminal (5) 125 based on the broadcasting channel information and the address information.

Through this, the user of the user terminal (5) 125 may confirm that food ordered by the user of the user terminal (5) 125 is ready.

That is, the system 110 may broadcast the queue number information of the user terminals 121, 122, 123, 124, and 125. Accordingly, the user of the user terminal (5) 125 is not required to stay and watch a display in the restaurant, until the queue number of the user of the user terminal (5) 125 is finally displayed. Also, the user of the user terminal (5) 125 may move freely within the coverage of the system 110, for example, the shopping mall, until the ordered food is ready.

The system 110 may also collect and store user information of the user of the user terminal (5) 125.

For example, the system 110 may collect information about menu items ordered by the user of the user terminal (5) 125. When the user terminal (5) 125 transmits the queue order registration request, the system 110 may provide the user terminal (5) 125 with information about the user's favorite menu.

In one example, a plurality of wireless nodes may be installed in the shopping mall to broadcast queue number information, and thus a broadcasting coverage may be extended. Accordingly, a greater movement range may be provided to a user. For example, when the shopping mall has five floors, and a wireless broadcasting node is installed in every floor, a greater coverage may be provided, resulting in a greater movement range of the user.

Figure 2:
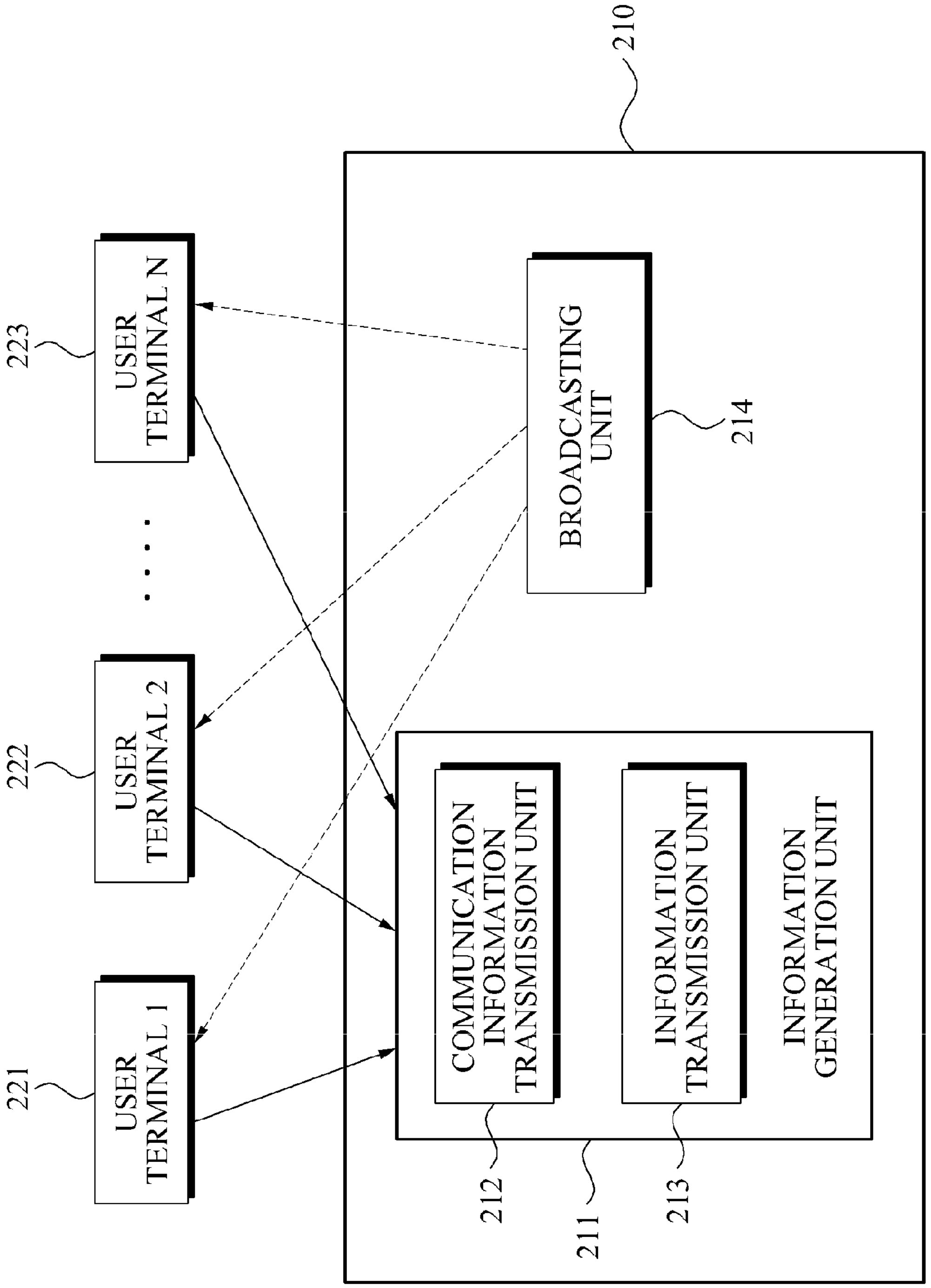
FIG. 2 is a block diagram illustrating a configuration of an exemplary system for managing a queue order.

FIG. 2 illustrates an exemplary system 210 for managing a queue order.

The system 210 for managing a queue order (also referred to as the system 210) and a user terminal (1) 221, a user terminal (2) 222, . . . and a user terminal N 223 are illustrated in FIG. 2.

The system 210 may include an information generation unit 211 and a broadcasting unit 214.

The information generation unit 211 may receive queue order registration requests from at least one of the user terminals 221, 222, . . . and 223, and generate queue order information of the at least one user terminal.

When the queue order information changes, the broadcasting unit 214 may broadcast notification information about the change of the queue order information.

The information generation unit 211 may generate queue number information of each of the at least one user terminal based on an order of receiving the queue order registration requests.

In this example, the broadcasting unit 214 may sequentially include the queue number information of each of the at least one user terminal in the notification information, every time the queue order information changes.

The information generation unit 211 may include an information transmission unit 213.

When the information generation unit 211 receives the queue order registration requests from one of the at least one user terminal, the information transmission unit 213 may transmit queue number information of the one user terminal to the one user terminal.

Also, the information generation unit 211 may include a communication information transmission unit 212.

When a queue order registration request is received from one of the at least one user terminal, the communication information transmission unit 212 may transmit broadcasting channel information and address information to the one user terminal.

In this case, said user terminal may receive the notification information based on the broadcasting channel information and the address information.

When a cancellation request of the queue order registration is received from one of the at least one user terminal, the information generation unit 211 may update the queue number information of each of the at least one user terminal, based on queue number information of the one user terminal.

Figure 3:
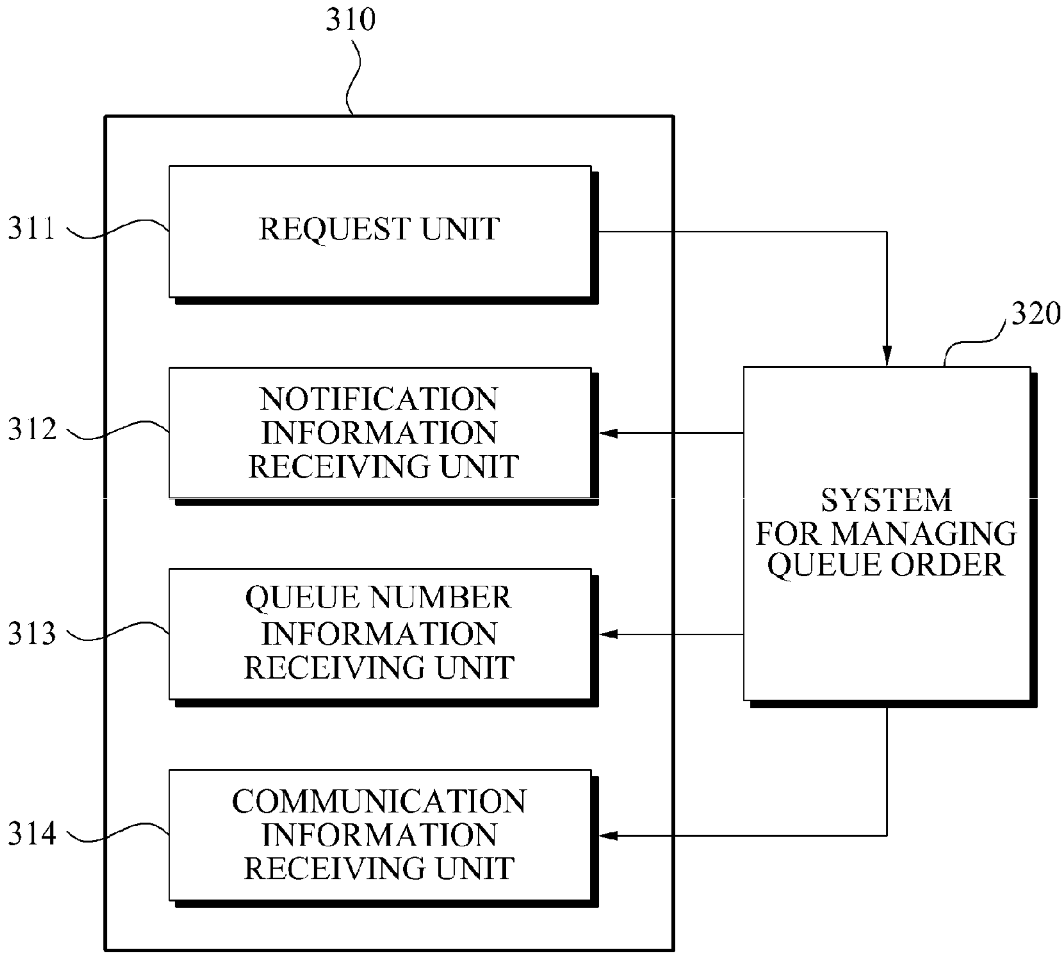
FIG. 3 is a block diagram illustrating a configuration of an exemplary terminal device.

FIG. 3 illustrates an exemplary terminal device 310.

The terminal device 310 and a system 320 for managing a queue order (also referred to as the system 320) are illustrated in FIG. 3.

The terminal device 310 may include a request unit 311 and a notification information receiving unit 312.

The request unit 310 may transmit a queue order registration request to the system 320.

The system 320 may receive the queue order registration request from at least one terminal device including the terminal device 310, and generate queue order information of the at least one terminal device.

When the queue order information changes, the system 320 may broadcast notification information about the change of the queue order information.

The notification information receiving unit 312 may receive the notification information about the change of the queue order information broadcasted from the system 320.

The system 320 may generate queue number information of each of the at least one terminal device based on an order of receiving queue order registration requests transmitted from each of the at least one terminal device.

For example, the notification information may sequentially include the queue number information of each of the at least one terminal device, every time the queue order information changes.

The terminal device 310 may further include a queue number information receiving unit 313.

The queue number information receiving unit 313 may receive first queue number information, associated with a current queue number, from the system 320.

For example, when a current queue number of the terminal device 310 is 'two', the queue number information receiving unit 313 may receive first queue number information, associated with the queue number 'two', from the system 320.

The request unit 311 may transmit a cancellation request of the queue order registration to the system 320 depending on a choice of a user.

The system 320 may update the queue number information of each of the at least one terminal device based on the first queue number information, when the cancellation request of the queue order registration is received.

Also, the terminal device 310 may further include a communication information receiving unit 314.

The communication information receiving unit 314 may receive broadcasting channel information and address information from the system 320.

The notification information receiving unit 312 may receive the notification information based on the broadcasting channel information and the address information.

Figure 4:
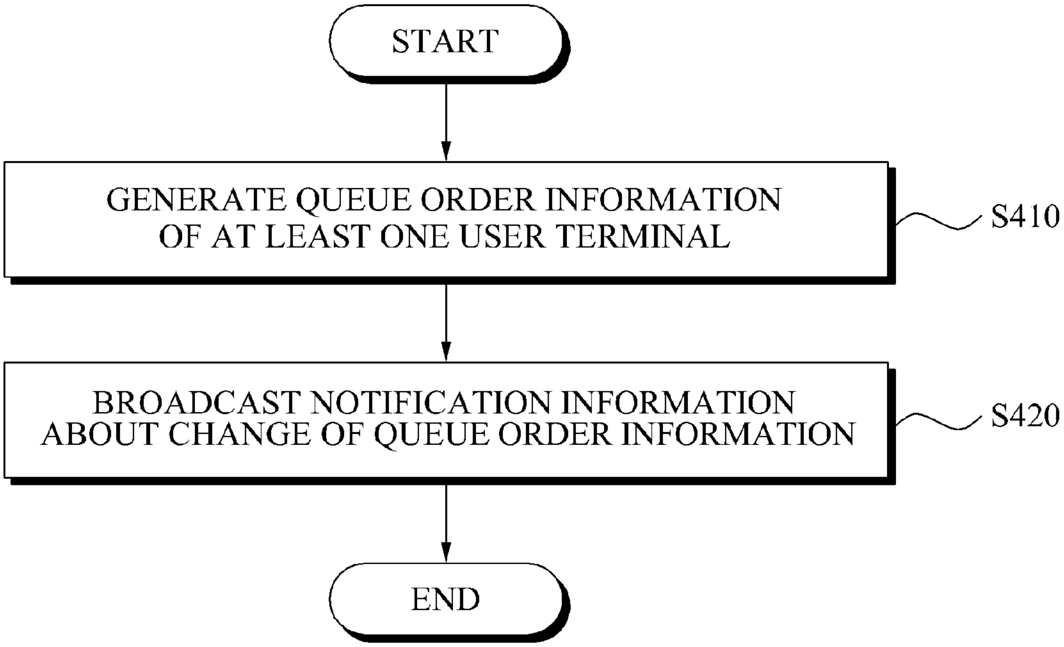
FIG. 4 is a flowchart illustrating an exemplary method of managing a queue order.

FIG. 4 illustrates an exemplary method of managing a queue order.

In operation S410, queue order registration requests may be received from at least one user terminal, and queue order information of the at least one user terminal may be generated.

In operation S420, when the queue order information changes, notification information about the change of the queue order information may be broadcasted.

For example, in operation S410, queue number information of each of the at least one user terminal may be generated based on an order of receiving the queue order registration requests.

In operation S420, every time the queue order information changes, the queue number information of each of the at least one user terminal may be sequentially included in the notification information.

Also, in operation S410, when a queue order registration request is received from any one user terminal of the at least one user terminal, an operation of transmitting queue number information of the one user terminal to the one user terminal, may be included.

Also, in operation S410, when the queue order registration request is received from any one user terminal of the at least one user terminal, an operation of transmitting broadcasting channel information and address information to the one user terminal, may be included.

Accordingly, the one user terminal may receive the notification information based on the broadcasting channel information and the address information.

Also, in operation S410, when a cancellation request of the queue order registration is received from any one user terminal of the at least one user terminal, an operation of updating the queue number information of each of the at least one user terminal based on queue number information of the one user terminal, may be included.

The method of managing a queue order is described above with reference to FIG. 4. The method of managing a queue order may be implemented by, for example, the system for managing a queue order described above with reference to FIGS. 1 and 2, and accordingly, further description thereof will be omitted for conciseness.

The methods described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A system for managing a queue order, the system comprising:

an information generation unit configured to receive queue order registration requests from a plurality of user terminals, and configured to generate queue order information of the plurality of user terminals; and a broadcasting device configured to simultaneously broadcast to the plurality of user terminals, notification information indicating a change of the queue order information, wherein the notification information simultaneously broadcast to each of the plurality of user terminals comprises queue number information of a first terminal in the queue from among the plurality of user terminals included in the queue, wherein the notification information simultaneously broadcast to each of the plurality of user terminals comprises queue number information of the first terminal and queue number information of the remaining plurality of user terminals included in the queue.

2. The system of claim 1, wherein the information generation unit generates queue number information of each of the plurality of user terminals based on an order of receiving the queue order registration requests, and the broadcasting unit sequentially includes the queue number information of each of the plurality of user terminals in the notification information, each time the queue order information changes.

3. The system of claim 2, wherein the information generation unit comprises:

an information transmission unit configured to transmit queue number information of a respective user terminal from among the plurality of user terminals, to the respective user terminal, in response to the information generation unit receiving a queue order registration request from the respective user terminal.

4. The system of claim 2, wherein the information generation unit comprises:

a communication information transmission unit configured to transmit broadcasting channel information and address information to a respective user terminal from among the plurality of user terminals, in response to a queue order registration request being received from the respective user terminal, wherein the respective user terminal receives the notification information based on the broadcasting channel information and the address information.

5. The system of claim 2, wherein, in response to a cancellation request of the queue order registration being received from a respective user terminal from among the plurality of user terminals, the information generation unit updates the queue number information of each of the plurality of user terminals based on the queue number information of the respective user terminal.

6. The system of claim 1, wherein the broadcasting unit is configured to transmit notification information to each of the plurality of terminals indicating each respective terminal's position in the queue.

7. The system of claim 1, wherein the broadcasting unit is configured to transmit notification information based on queue number information of a user terminal requesting the cancellation from registration in the queue.

8. A terminal device comprising:

a request device configured to transmit a queue order registration request to a system for managing a queue order; and a notification information receiving unit configured to receive notification information about a change of queue order information, the queue order information being simultaneously broadcasted from the system for managing a queue order to a plurality of user terminals, wherein the notification information simultaneously broadcast to each of the plurality of user terminals comprises queue number information of a first terminal in the queue from among the plurality of user terminals included in the queue, wherein the notification information simultaneously broadcast to each of the plurality of user terminals comprises queue number information of the first terminal and queue number information of the remaining plurality of user terminals included in the queue.

9. The terminal device of claim 8, wherein the system for managing a queue order generates queue number information of each of the plurality of terminal devices based on an order of receiving the queue order registration requests transmitted from each of the plurality of terminal devices, and the notification information sequentially includes the queue number information of each of the plurality of terminal devices, each time the queue order information changes.

10. The terminal device of claim 9, further comprising:

a queue number information receiving unit configured to receive the queue number information of the next terminal in the queue, from the system for managing a queue order.

11. The terminal device of claim 9, further comprising:

a communication information receiving unit configured to receive broadcasting channel information and address information from the system for managing a queue order, wherein the notification information receiving unit receives the notification information based on the broadcasting channel information and the address information.

12. The terminal device of claim 10, wherein the request unit transmits a cancellation request of the queue order registration to the system for managing a queue order based on a choice of a user, and the system for managing a queue order updates the queue number information of each of the plurality of terminal devices based on the first queue number information, in response to the cancellation request of the queue order registration being received.

13. A method of a device for managing a queue order, the method comprising:

receiving, by the device, queue order registration requests from a plurality of user terminals, and generating queue order information of the plurality of user terminals; and broadcasting, simultaneously to the plurality of user terminals, notification information indicating a change of the queue order information, wherein the notification information simultaneously broadcast to each of the plurality of user terminals comprises queue number information of a first terminal in the queue from among the plurality of user terminals included in the queue, wherein the notification information simultaneously broadcast to each of the plurality of user terminals comprises queue number information of the first terminal and queue number information of the remaining plurality of user terminals included in the queue.

14. The method of claim 13, wherein the generating of the queue order information comprises generating queue number information of each of the plurality of user terminals based on an order of receiving the queue order registration requests, and the broadcasting of the notification information comprises sequentially including the queue number information of each of the plurality of user terminals in the notification information, each time the queue order information changes.

15. The method of claim 14, wherein the generating of the queue order information comprises:

transmitting queue number information of a respective user terminal from among the plurality of user terminals to the respective user terminal, in response to queue order registration request being received from the respective user terminal.

16. A non-transitory computer-readable storage medium storing a program to manage a queue order, comprising instructions to cause a computer to:

receive queue order registration requests from a plurality of user terminals, and generating queue order information of the plurality of user terminals; and in response to the queue order information changing, simultaneously broadcasting notification information about the change of the queue order information to the plurality of user terminals, wherein the notification information simultaneously broadcast to each of the plurality of user terminals comprises queue number information of a first terminal in the queue from among the plurality of user terminals included in the queue, wherein the notification information simultaneously broadcast to each of the plurality of user terminals comprises queue number information of the first terminal and queue number information of the remaining plurality of user terminals included in the queue.

* * * * *